United States Patent [19]

Wakahara et al.

[11] Patent Number: 4,921,751
[45] Date of Patent: May 1, 1990

[54] CONDUCTIVE FABRIC AND A METHOD FOR THE MANUFACTURE OF THE CONDUCTIVE FABRIC, AND A CONDUCTIVE SHEET AND FILM MADE USING THE CONDUCTIVE FABRIC

[75] Inventors: Hideki Wakahara, Ohtsu; Yoshihiro Matsuo, Moriyama; Minoru Kawamura, Hirakata, all of Japan

[73] Assignee: Sekisui Kagaku Kogyo Kabushiki Kaisha, Osaka, Japan

[21] Appl. No.: 41,779

[22] Filed: Apr. 23, 1987

[30] Foreign Application Priority Data

Apr. 24, 1986 [JP] Japan .................................. 61-95799

[51] Int. Cl.$^5$ .......................... B32B 5/04; B32B 5/08; D03D 15/04; D06C 29/00
[52] U.S. Cl. .................................... 428/229; 26/18.5; 26/18.6; 28/156; 28/165; 28/167; 66/202; 139/420 A; 139/425 R; 139/426 R; 156/308.2; 428/230; 428/253; 428/255; 428/256; 428/922
[58] Field of Search .................. 26/18.5, 18.6; 28/156, 28/165, 167; 428/230, 253, 255, 256, 922, 229

[56] References Cited

U.S. PATENT DOCUMENTS 3,849,242 11/1974 Takeya et al. .
4,532,099 7/1985 Kaji ..................................... 264/510

FOREIGN PATENT DOCUMENTS 1002724 2/1957 Fed. Rep. of Germany .

Primary Examiner—James C. Cannon
Attorney, Agent, or Firm—Irell & Manella

[57] ABSTRACT

A conductive fabric comprising conductive fibers and thermoplastic fibers with a higher heat shrinkage than that of said conductive fibers, said conductive fibers being crimped by heat shrinkage of said thermoplastic fibers. This invention also provides a conductive sheet or film comprising the conductive fabric and a base on which said conductive fabric is disposed, said conductive fabric and said base that are laminated together being fused into one piece by being heated at a temperature above the melting point of the thermoplastic fibers and melting said thermoplastic fibers.

14 Claims, 9 Drawing Sheets

FIG.1
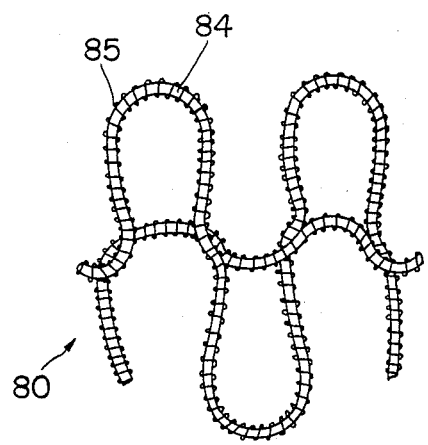
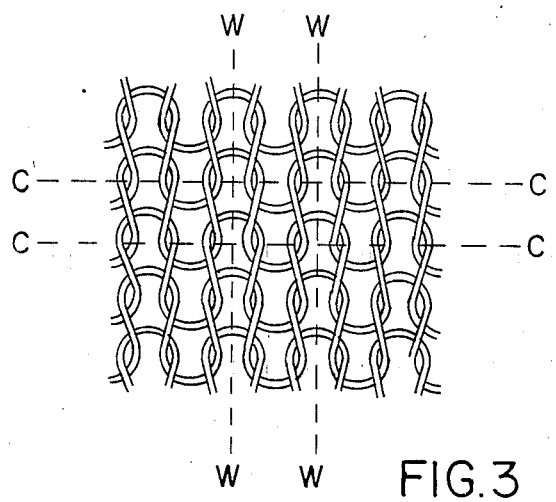
FIG.3

CONDUCTIVE FABRIC AND A METHOD FOR THE MANUFACTURE OF THE CONDUCTIVE FABRIC, AND A CONDUCTIVE SHEET AND FILM MADE USING THE CONDUCTIVE FABRIC

BACKGROUND OF THE INVENTION

1. Field of the invention:

This invention relates to a conductive fabric with a large spreading ratio made with crimped conductive fibers, a method for the manufacture of this conductive fabric, and a conductive sheet and film made with the use of the said conductive fabric.

2. Description of the prior art:

The trays, containers, packaging, etc., used for the packing or transportation of electronic devices such as semiconductor devices, etc., that are in danger of being damaged in their functioning by the invasion of static electricity or noise, and the filing cases, etc., that are used to store recording materials such as magnetic disks, magnetic cards, etc., which are sensitive in the same way to static electricity and noise, must be prevented from being charged with electricity, and moreover need conductivity to shield their contents from electromagnetic waves. As the containers mentioned above, molded plastics containing carbon black and conductive fillers such as short metal fibers, etc., have been put into practical use. However, to lend the desired conductivity to such plastic, it is necessary to use a large quantity of conductive filler, which causes the molded parts to be molded in an unsatisfactory way and causes a decrease in the mechanical strength.

To eliminate these problems, an inexpensive method for manufacturing conductive sheets for wrapping of parts such as IC, etc., has been proposed by, for example, Japanese Laid Open Patent Publications Nos. 58-155917 and 58-166035, in which a non-woven fabric, a knit, or a textile, made from a fiber mixture of conductive fiber and thermoplastic fibers is disposed on a base and heated to a temperature above the temperature at which the thermoplastic fibers melt, to adhere itself thereby to the base, resulting in a conductive sheet for wrapping of parts such as IC, etc.

However, the conductive textile of the sheets made in the way described above cannot stretch, and when the said sheet is treated by deep drawing processing by vacuum forming or pressure forming, the sheet is stretched and the conductive textile is ripped, which causes lowering of the conductivity of the resulting molded article. Moreover, in sheets made from a non-woven fabric or a knit manufactured by the method described above, a certain amount of stretching is made possible by the structure of the non-woven fabric and the knit, but when the sheet is treated by deep drawing processing by which the surface area before and after the non-woven fabric and the knit is stretched (that is, the spreading ratio) becomes 2 times or more, the conductive non-woven fabric or knit is ripped in the same way as with the textile, which causes the lowering of the conductivity of the resulting molded article. For this reason, there is the problem that it is not possible to make a container, etc., with a deep bottom that has superior conductivity from a flat sheet with a conductive fabric therein.

SUMMARY OF THE INVENTION

The conductive fabric of this invention, which overcomes the above-discussed and numerous other disadvantages and deficiencies of the prior art, comprises conductive fibers and thermoplastic fibers with a higher heat shrinkage than that of said conductive fibers, said conductive fibers being crimped by heat shrinkage of said thermoplastic fibers.

In a preferred embodiment, the conductive fibers and the thermoplastic fibers form a textile or a knit.

The method for the manufacture of the conductive fabric made with conductive fibers and thermoplastic fibers of this invention comprises giving the conductive fibers and the thermoplastic fibers, respectively, a first twist; twisting both the conductive fibers and the thermoplastic fibers with a higher heat shrinkage than that of the conductive fibers into a single twisted thread; weaving or knitting the single threads twisted together to continuously form a textile or a knit; gathering at least the selvedges of the textile or the knit to form gathers of a fixed size by a gathering apparatus; and heating the gathered textile or knit in a manner to maintain said gathers.

In a preferred embodiment, the number of first twists given to the thermoplastic fibers is greater than that of first twists given to the conductive fibers.

In a preferred embodiment, the diameter of the thermoplastic fibers is greater than that of the conductive fibers.

In a preferred embodiment, the gathering apparatus comprises supports for supporting the textile or the knit with fixed intervals in the direction in which the textile or the knit is continuously formed, and pushers for pushing the textile or the knit toward the spaced supports in sequence to form gathers.

In a preferred embodiment, the supports and said pushers are a pair of gears that mesh together.

In a preferred embodiment, the supports are disposed on the outer surface of an endless belt.

In a preferred embodiment, the endless belt is disposed in such a manner that the outer surface thereof faces one surface of the textile or the knit.

In a preferred embodiment, the endless belt is disposed in such a manner that the outer surface thereof moves at almost right angles to the textile or the knit.

In a preferred embodiment, the pushers move back and forth from positions separated from the textile or the knit to positions in which they fit into the spaces between the adjacent supports supporting the textile or the knit thereon.

The conductive sheet or film of this invention comprises a conductive fabric composed of conductive fibers and thermoplastic fibers with a higher heat shrinkage than that of the conductive fibers, said conductive fibers being crimped by heat shrinkage of said thermoplastic fibers, and a base on which said conductive fabric is disposed, said conductive fabric and said base that are laminated together being fused into one piece by being heated at a temperature above the melting point of the thermoplastic fibers and melting said thermoplastic fibers.

In a preferred embodiment, the conductive fabric is a textile or a knit.

In a preferred embodiment, the base is a sheet or film of synthetic resin.

Therefore, the invention described herein makes possible the objects of (1) providing a conductive fabric that has a large spreading ratio; (2) providing a conductive fabric that, by simply being fixed onto a sheet as base, is superior in its ability to prevent charging with electricity and the ability to shield from electromagnetic waves; (3) providing a method for the safe and continuous manufacture of a conductive fabric with a large spreading ratio; (4) providing a conductive sheet or film the conductive fibers of which are not ripped even when the sheet is treated by deep drawing processing by which the surface area before and after the sheet is stretched (i.e., the spreading ratio becomes 2 times or more); (5) providing a conductive sheet or film that can be formed into a container, etc., with a deep bottom that has the ability to prevent charging with electricity and the ability to shield the contents from electromagnetic waves.

BRIEF DESCRIPTION OF THE DRAWINGS

This invention may be better understood and its numerous objects and advantages will become apparent to those skilled in the art by reference to the accompanying drawings as follows:

FIG. 1 is a plane view showing a part of the conductive fabric of this invention.

FIG. 3 is a schematic diagram showing a knit forming the conductive fabric of this invention.

DESCRIPTION OF THE PREFERRED EMBODIMENTS

The conductive fabric of this invention is, as is shown in FIG. 1, a fabric 80 that is formed as a textile or as a knit in such a manner that conductive fibers 85 are crimped around the outside of the thermoplastic fibers 84.

As the conductive fibers 85 that are used in the conductive fabric 80 of this invention, metallic fibers, carbon fibers, fibers of synthetic resin to which metal ions are adsorbed, metal-plated synthetic resin fibers, etc., can be used. The synthetic resin fiber to which metal ions are adsorbed is prepared by adsorbing copper ions onto, for example, an acrylonitrile fiber and reducing it. The said synthetic resin fiber to which metal ions have adsorbed is particularly flexible, for which reason it is preferably used in this invention.

As the thermoplastic fibers 84, fibers made of polyolefine resin such as polyethylene, polypropylene, etc., polyamide resin, polyester resin, polyacrylonitrile resin, polyvinylchloride resin, polycarbonate resin, polymethyl methacrylate resin, etc., are suitable. In particular, fibers should be chosen that have a greater heat shrinkage than that of the conductive fiber. When a transparent final product is required, it is particularly preferred to use resin fibers that are as transparent as resins or more transparent such as polyvinylchloride resin, polycarbonate resin, polymethyl methacrylate resin, etc., which are used as the base to be described below.

Figure 2:
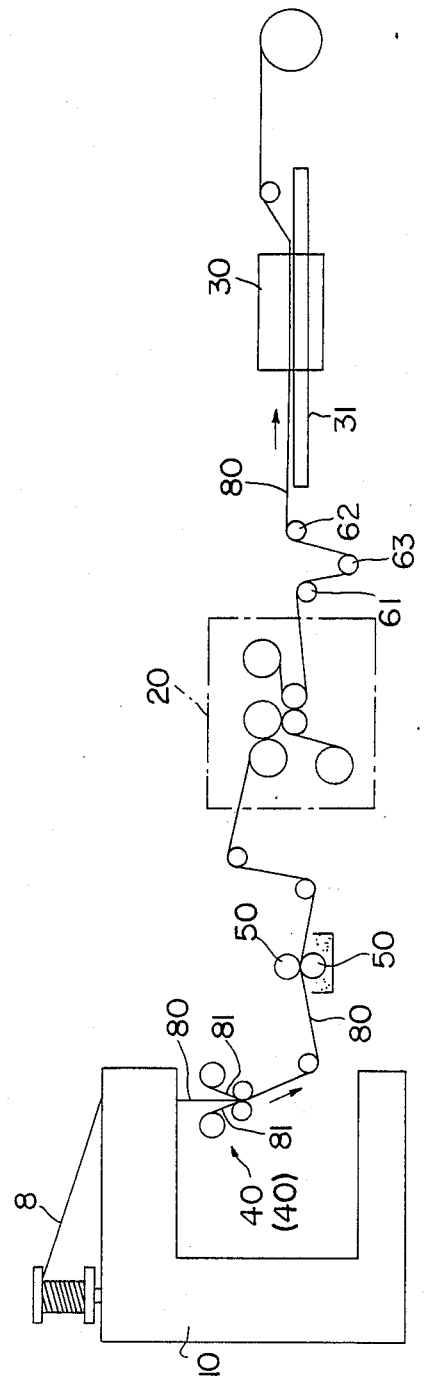
FIG. 2 is a schematic diagram showing the manufacturing process for the conductive fabric.

The conductive fabric of this invention is manufactured by a method comprising the twisting of conductive fibers and thermoplastic fibers with a greater heat shrinkage than that of the said conductive fibers into a single twisted thread; the weaving or knitting the single threads twisted together, as shown in FIG. 2, to continuously form a knit by a flat knitting machine 10; gathering of the knit to continuously form gathers by a gathering apparatus 20; and heating of the gathered knit by a furnace 30 so as to shrink the gathered knit.

In the twisting process, first, at least one of the filament yarn made from the conductive fibers or at least one of the spun yarn made from the conductive short fibers that has been given its first twist, and at least one of the thermoplastic yarn made from thermoplastic resin that has been also given its first twist are pulled out together and twisted with each other in the reverse direction (this is called the final twist), giving a finished twisted thread.

At this time, if the final twist has a large number of twists therein, the extent of crimping of the conductive fiber that is obtained by the succeeding processes becomes large, which is preferred. If the torsion stress used for the first twist of the thermoplastic fibers is greater than that for the conductive fibers, the number of final twists of the conductive fibers in the thread twisted together that is obtained is increased, and in the same way as mentioned above, the extent of crimping of the conductive fibers increases, which is preferred. That is, the number of final twists of the conductive fibers in the thread twisted together that is obtained is set depending upon the condition whereby a balance of the torsion stress of the first twist of these different fibers with the torsion stress of their final twist is maintained, and accordingly, when the torsion stress of the first twist of the thermoplastic fibers is made large, the rebound force is added to the torsion stress of the final twist of the conductive fibers, so that the number of final twists of the conductive fibers becomes greater than that before the rebound force is added to the conductive fibers. In this case, as methods to increase the torsion stress, the numbers of twists can be made greater, or the diameter of the fibers can be made large.

The thread twisted together, 8, obtained in this way is supplied to the flat knitting machine 10 of the knitting process, by which the thread 8 is continuously formed into, for example, a knit.

To obtain such a knit, not only a flat knitting machine 10 can be used, but also a circular knitting machine, a warp knitting machine, etc., can be used. Knit has a large spreading ratio, and, as shown in FIG. 3, if knitting is done so that the space of the needle wale W is about twice the space of the course C, there is about the same amount of spreading horizontally and vertically, which is preferred.

Figure 4:
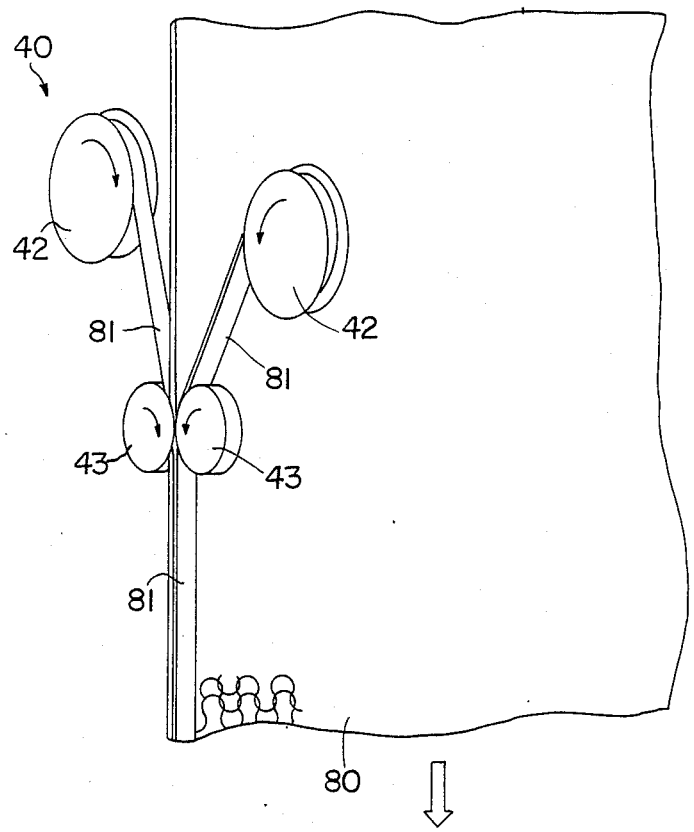
FIG. 4 is a perspective view showing an apparatus by which tape is attached to the conductive fabric.

The knit 80 that is obtained from said flat knitting machine 10 has strips of adhesive tape 81 pasted onto both the upper and under sides of the selvedges by taping devices 40, as needed. Both of the taping devices 40 are disposed in the vicinity of the selvedges of the knit 80 that is produced continuously by the flat knitting machine 10. Both taping devices 40 are provided with, as shown in FIG. 4, a pair of tape supply rollers 42, which are disposed so as to face the upper and under sides of the selvedges of the knit 80, and a pair of pushing rollers 43, which attach the strips of adhesive tape 81 supplied by the tape supply rollers 42 onto the upper side and under side in the vicinity of the selvedges of the knit 80. The pushing rollers 43 face each other in a manner to sandwich therebetween the selvedges of the knit 80, and the strips of adhesive tape 81 from the tape supply rollers 42 are put with pressure together with the selvedges of the knit 80 between the pushing rollers 43.

In this way, since the selvedges on both sides of the knit 80 are pasted with strips of adhesive tape 81 immediately after being knitted, there is no danger of curling in the width direction of the selvedges, and even if the knit 80 is pulled in the direction of its needle wales (that is, in the longitudinal direction of the knit 80), there is no danger of shrinkage in the direction at right angles to said direction.

Such a knit 80 is passed through a pair of coating rollers 50, if needed, by which the knit 80 is coated with a solvent such as THF that dissolves the thermoplastic fibers, so that the interstices of the knit 80, that is, the points of intersection of the threads twisted together, dissolve, and become unified. This prevents the loss of any interstices in the knit 80. In particular, during the succeeding heating process, even when a hot-air furnace is used, there is no danger that there will be loss of any interstices. Moreover, by the dissolving of a resin of the same variety as the thermoplastic fibers with, for example, THF, the thermoplastic fibers and the conductive fibers are fixed more securely to each other, and in the succeeding heating process, the heat shrinkage of the thermoplastic fibers causes uniform, and fine crimping around the conductive fibers. Accordingly, when the fabric obtained is made to adhere with pressure to a sheet base of, e.g., polyvinylchloride, etc., by heating, the thermoplastic fibers are readily unified with the sheet base.

The knit 80 coated with a solvent is dried, and then supplied to the gathering apparatus 20, which continuously forms gathers with a fixed size in the direction in which the knit 80 is continuously formed. The gathering apparatus 20 comprises supports for supporting at least one side of the two selvedges of the knit 80 in the width direction with fixed intervals in the direction in which the knit 80 is continuously formed, and pushers for pushing the knit toward the spaced supports in sequence.

Figure 5:
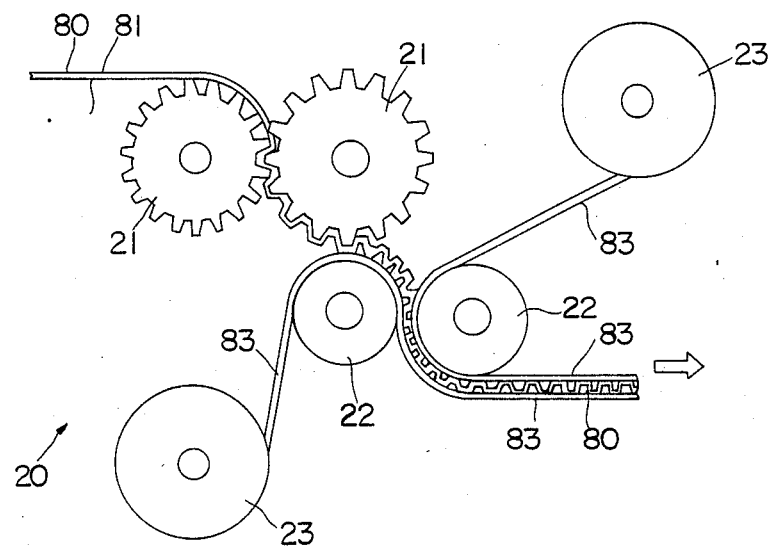
FIG. 5 is a side view showing a gathering apparatus used in this invention.

The gathering apparatuses 20 are disposed in the vicinity of both selvedges of the knit 80 transported and one of the gathering apparatuses 20 has, as is shown in FIG. 5, for example, a pair of gears 21 and a pair of pushing rollers 22. The gears 21 mesh with each other, and are placed so as to have fed into them the strips of adhesive tape 81 that have been pasted onto both selvedges of the knit 80. The selvedge of the knit 80 touches the surface of the gear tooth of one (i.e., the support) of the two gears, and is pushed down into the groove formed by the adjacent gear teeth by the gear teeth of the other gear (i.e., pusher) 21, resulting in a gather. By the formation of gathers along both selvedges of the knit 80, gathers are formed across the entire surface of the knit.

The knit 80, which has been shaped into gathers, passes along one of the gears 21, and is supplied to the space between the opposing pressure rollers 22. The knit 80 that has been formed into gathers moves along one of the gears 21, to be sandwiched between the pressure rollers 22. In order to prevent the selvedge of the knit 80 from being separated from the gear teeth of said gear 21 until the knit 80 is sandwiched between the pressure rollers 22, the gear 21 is preferably provided with an appropriate supporting means by which the gathers do not disappear.

The strips of adhesive tape 83 are supplied from the tape supply rollers 23 into the space between pushing rollers 22, and pasted over the upper side and the under side of the strips of adhesive tape 81 of the knit 80, which has been gathered, by being sandwiched between the pushing rollers 22. The gathers that have been formed on both selvedges of the knit 80 pass through the space between the pushing rollers 22, where the knit 80 is pushed down in a direction opposite to the direction of the supply of the knit 80.

The strips of adhesive tape 83 to be pasted on top of the strips of adhesive tape 81 that form the gathers function to prevent the gathers formed by the strips of adhesive tape 81 from disappearing by being stretched in the direction of supply of the knit 80, and accordingly two such tape 83 are not needed for pasting on both the upper side and the under side of the knit 80. Thus, the gathering apparatus 20 can be designed to supply the adhesive tape 83 to be pasted on one of both the upper side or the under side of the knit 80. A plurality of gathering apparatuses can be continuously operated depending upon the degree of crimping required.

The knit 80 gathered by the gathering apparatuses 20 is guided by a pair of fixed rollers 61 and 62 through a dancing roller 63 disposed between fixed rollers 61 and 62 (FIG. 2), and sent on to the heating process.

Figure 6:
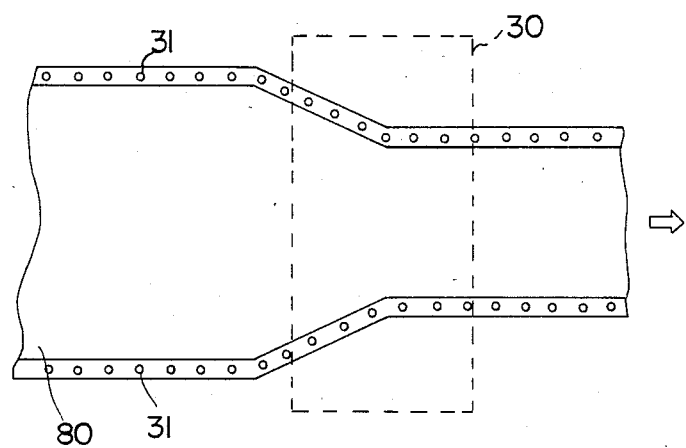
FIG. 6 is a schematic diagram showing a heating process of the conductive fabric.

The heating process is carried out by pintenters 31 and a furnace 30. The pintenters 31 fasten onto the selvedges of the knit 80, as shown in FIG. 6, with both selvedges in the downstream direction so that they are close to each other. In the downstream direction of the pintenters 31, there is the furnace 30, and said furnace 30 heats the knit 80 supplied by the pintenters 31 to a temperature at which the thermoplastic fibers of the knit 80 shrink.

Figure 7:
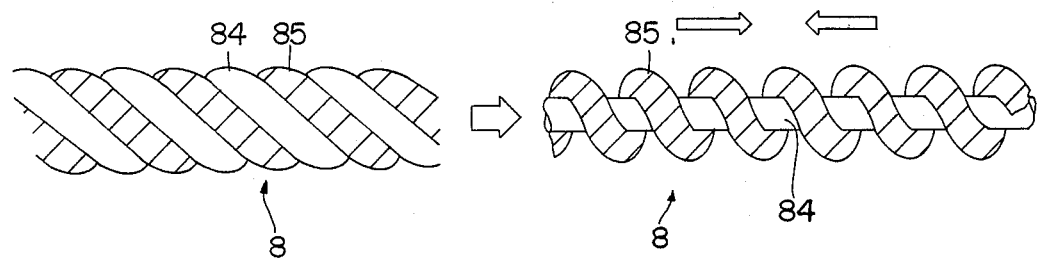
FIG. 7 is a plane view showing the shrinkage of a single twisted thread.

When the knit 80 is heated in the furnace 30, as shown in FIG. 7, the thermoplastic fibers in the thread twisted together of the knit 80 shrink because of the heat in the axial direction, and along with this heat shrinkage, the intervals between turns in the spiral of the conductive fibers 85, which have been twisted in a spiral, become smaller, and, as shown in FIG. 1, the conductive fibers come to be curled in a spiral. When the conductive fibers come to be curled and shrunken (namely, come to be crimped) in this way, the knit 80 also shrinks, but the shrinkage in the direction of the width of the knit 80 is restrained, because the two selvedges of the knit 80 are held by the pintenters 31, at the space between the rows of the pintenters 31. The said knit 80 is shrunken until the gathers that have been formed in the knit 80 are stretched out and disappear in the direction of the conveyance of the knit 80 (i.e., the direction in which the knit is continuously formed). That is, the shrinkage attained by heat-treatment of the knit 80 in the direction in which it is being formed is regulated by the size and the number of the gathers formed in the knit 80. Therefore, the shrinkage of the knit 80 is regulated by the height and the number of the gear teeth of the gears 21 of the gathering apparatuses 20 used during the gathering process. In this way, the conductive fibers of the conductive knit 80 can be crimped with the desired degree of crimping.

Thus, the conductive knit 80, which is made of thread twisted together consisting of conductive fibers, crimped in a spiral with small intervals around the outside of the thermoplastic fibers, is produced continuously.

Figure 8:
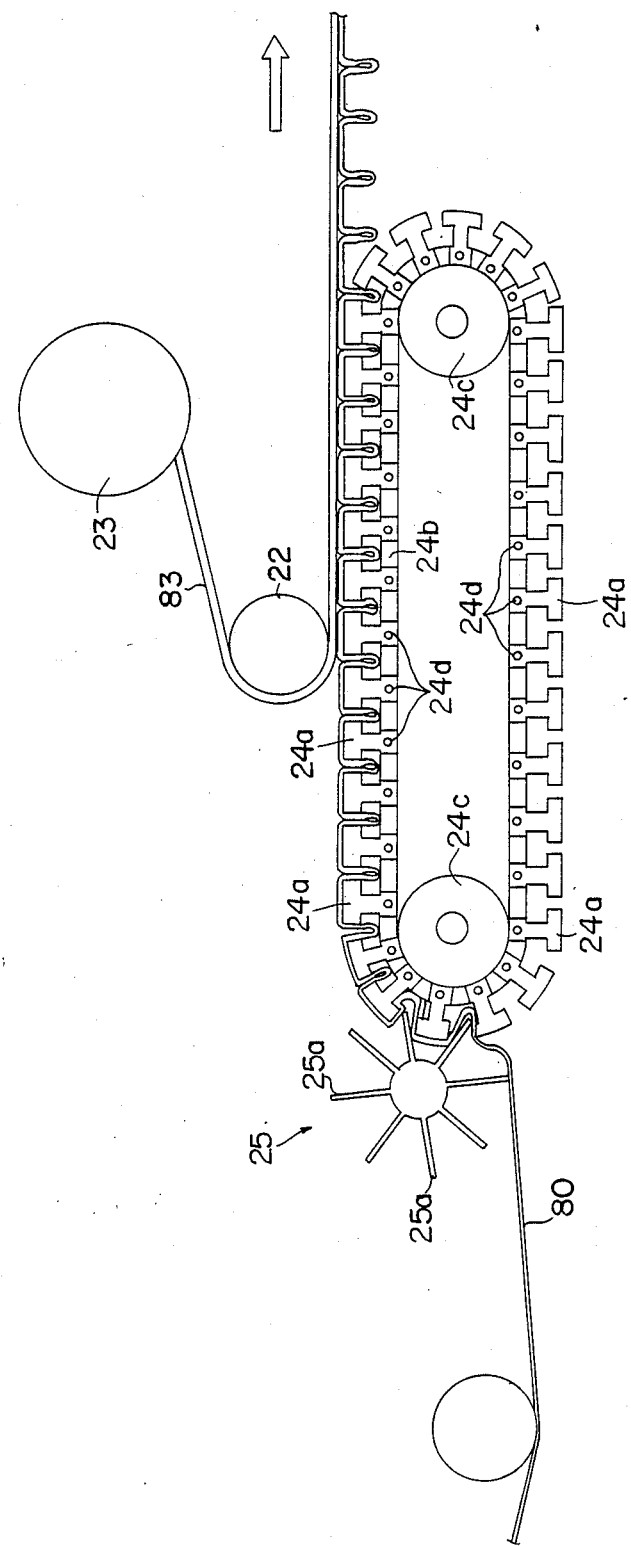
FIG. 8 is a side view showing another gathering apparatus.

In the gathering process, the pair of gathering apparatuses 20 to be disposed for each of the two selvedges of the knit are not limited to those provided with a pair of gears used in the above example, but can be those that comprise, as shown in FIG. 8, supports 24a disposed at the outer surface of the endless belt 24b that moves by rotation, and pushers 25 with pushing means 25a that radiate outward. The endless belt 24b has, for example, a pair of pulleys 24c, by the rolling of which the belt is conveyed. Each support 24a is lined up on the surface of the endless belt 24b in the direction of its movement, and is attached to the endless belt by, for example, pins 24d. Each support 24a is made of a soft or semihard rubber, for example. Its tip is wide in the direction of movement of the belt by rotation. The tips of the neighboring supports 24a are made so as to have a small amount of space therebetween, and the surface of these tips touches the lower surface of the knit 80 at its selvedges.

The pushers 25 have the pushing means 25a that radiate outward, which fit into the spaces between the supports 24a. The selvedges of the knit 80 that is conveyed forward are pushed into the spaces between the supports 24a in order by pushing means 25a of the pushers 25 at the circular portion of the endless belt 24b near one of the pulley 24c with which the belt 24b engages. In this circular portion, the space between the neighboring support 24a is larger than that of the other portions of the belt 24b, and thus the selvedges of the knit 80 can be certainly pushed into the space to form a gather. Then, the pushing means 25a of the pushers 25 is removed from the space between the supports 24a, and the selvedges of the knit 80 that have been pushed into the said space are sandwiched between the neighboring supports 24a; there is no danger that they will come loose from the space therebetween.

A pushing roller 22 that faces the surfaces of the tips of the supports 24a is disposed in the downstream in the direction of movement of the endless belt 24b. An adhesive tape 83, which is supplied from a tape supply roller 23, is sent to the space between the surfaces of the tips of the supports 24a and the pushing roller 22, and the adhesive tape 83 is pasted onto the knit 80 in which gathers have been formed in along its selvedges.

In these gathering apparatuses 20, the gathered knit 80 can be directly supplied to the heating process by the endless belt 24b without use of a dancing roller 63, etc.

Figure 9A:
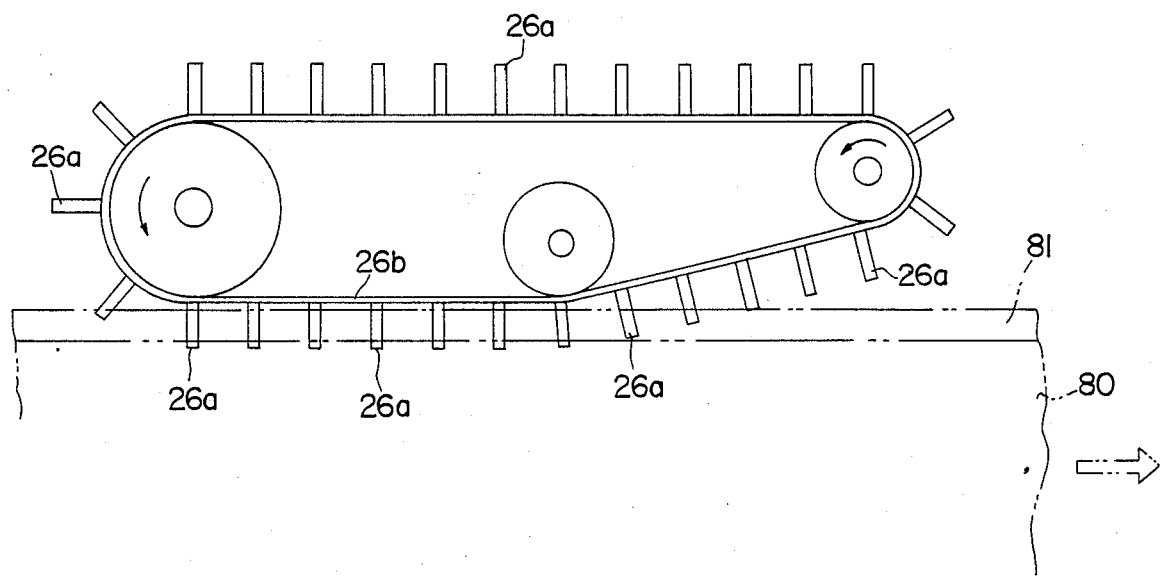
FIG. 9(a) is a plane view showing another gathering apparatus.
Figure 9B:
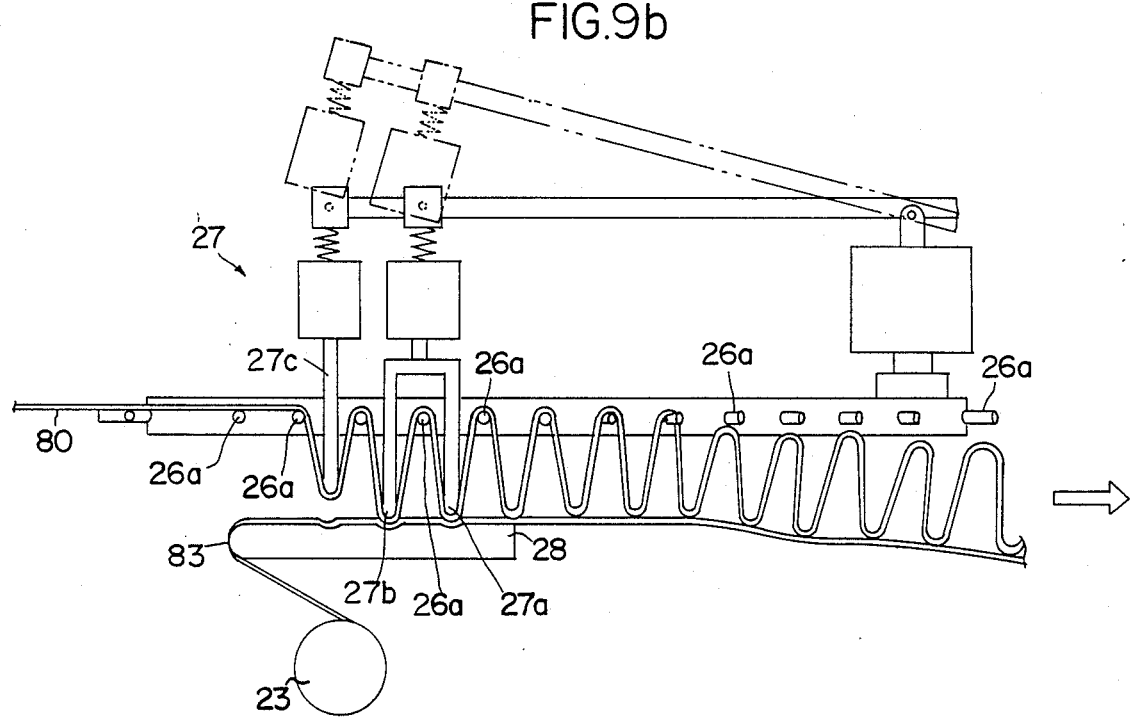
FIG. 9(b) is a side view of the gathering apparatus shown in FIG. 9(a).

Other gathering apparatuses 20, as shown in FIG. 9(a) and 9(b), can be used in which an endless belt 26b that rotates is disposed at each of the selvedges of the knit 80, and the outer surface of said endless belt 26b has rod-shaped supports 26a that have fixed intervals therebetween.

The endless belt 26b is bent in such a manner that the supports 26a touch the selvedges of the knit 80 in the upstream direction of the conveyance of the knit 80, and are released from the knit 80 in the downstream direction of the conveyance of the knit 80. Then, the supports 2a are disposed on the endless belt 26b in such a manner that when they are located upstream of the direction of conveyance, they are fixed to the endless belt without shaking, and when they are located downstream of the conveyance direction (namely, when they are outside the region of conveyance of the knit 80), they shake. The spread of the rotation of the endless belt 26b is set at the same speed as the conveyance of the knit 80.

Pushers 27 has three pushing means 27a, 27b, and 27c that fit into the spaces between four supports 26a that are placed beneath the selvedges of the knit 80. The pushing means 27a and 27b that are disposed in the downstream direction of conveyance of the knit 80 are unified as one body, and the pushing means 27c that is placed upstream begins to move down slightly later than the pushing means 27a and 27b and to move up at the same time as the pushing means 27a and 27b. These pushing means 27a, 27b, and 27c move up and down together with the same cycle as the speed of rotation of the endless belt 26b, and they move back and forth so as to release the knit 80 and then to push the selvedge of the knit 80 into the space between the neighboring supports 26a.

A receiving stand 28 is disposed at the position in which it faces the pushing means 27a, 27b, and 27cso as to sandwich the knit 80 therebetween. Onto said receiving stand 28, a tape supply roller 23 supplies a adhesive tape 83. Then, the pusher 27 moves downward, and the two pushing means 27a and 27b that are placed in the downstream direction of the conveyance of the knit 80 push the selvedge of the knit 80 into the space between the supports 26a, resulting in a gather in the selvedge. At that time, the bottom part of the gather made in the selvedge of the knit 80 touches the adhesive tape 83, and the said adhesive tape 83 is pasted onto the gathers that have been formed. Since the pushing means 27c placed upstream from the direction of conveyance of the knit 80 begins to move down later than the other pushing means 27a and 27b, such a movement of the pushing means 27c results in an introduction of the upstream portion of the knit 80 into this gathering apparatus in a manner to maintain the state in which the gather has been formed by the pushing means 27a and 27b and the supports 26a is fixed to the adhesive tape 83, so that gathers can be formed in order, without losing the gathers that have been formed. Then, the pushing means 27a, 27b and 27c move up at the same time. These pushing means 27a, 27b, and 27c act repeatedly in the abovementioned way to form gathers.

The knit 80, which has been gathered, is conveyed forward with its selvedges fastened to the supports 26a, and the endless belt 26b moves outside the region of conveyance of the knit 80, so the selvedge of the knit 80 is released from the supports 26a, and the knit 80 is conveyed forward with the adhesive tape 83 fixed on its gathers. At this time, each support 26a shakes with respect to the endless belt 26b, and accordingly the selvedge of the knit 80 is readily separated from the supports 26a. The gathering apparatus 20 shown in FIG. 9 readily forms gathers of a large size, and is preferably used to obtain a conductive fabric with a great degree of crimping.

The heat shrinkage of the thermoplastic fibers of the conductive fabric is described below:

First, the case in which the conductive fabric is a knit is explained. The knitted structure of a knit gives a spreading ratio, ordinarily, of 1.3–1.7 times, and in order to obtain a spreading ratio of 2 times or more, it is required that the conductive fibers provide a spreading ratio of about 1.6 times due to their crimping, i.e., the degree of crimping of 25% or more.

Given that the degree of crimping of a thread twisted together in which there is only twisting together is $\alpha$, and given that the heat shrinkage of the thermoplastic fibers is $\beta$ when the heat shrinkage of the conductive fibers is nearly equal to 0%, the minimum values of $\beta$ corresponding to the values of $\alpha$ that are required to obtain the degree of crimping of the conductive fibers, 25% or more, are shown in Table 1.

Next, the case in which the conductive fabric is made from a textile is explained. The structure of a textile precludes any expectation of stretching, and to obtain a spreading ratio of 2 times or more, the degree of crimping of the conductive fibers of 45% or more is needed. In the same way as the above-mentioned case of the knit, the minimum values of $\beta$ corresponding to the values of $\alpha$ are shown in Table 2.

TABLE 1

| $\alpha$ (%) | $\beta$ (%) |
|---|---|
| 5 | 21 |
| 10 | 18 |
| 15 | 12 |
| 20 | 7 |

TABLE 2

| $\alpha$ (%) | $\beta$ (%) |
|---|---|
| 10 | 40 |
| 20 | 31 |
| 30 | 21 |
| 40 | 8 |

Next, conductive films or sheets from the conductive fabric made in this way are explained. The description below relates to the use of the conductive fabric mentioned above for either conductive sheets or films, and the said conductive fabric is an intermediate product that occurs during the manufacturing process of said conductive sheets or films from the said conductive fabric.

As a base on which the conductive fabric with the structure mentioned above is laminated, plastic sheets or films made of polyolefine resin, polyamide resin, polyester resin, polyacrylonitrile resin, polyvinyl chloride resin, polycarbonate resin, polymethyl methacrylate resin, etc., can be used. In particular, plastic sheets or films made of polyvinylchloride resin, polycarbonate resin, polymethyl methacrylate resins, etc., that have 70% or more transparency to all kinds of light are suitable for use when the final product is transparent. It is preferable that the thermoplastic fibers in the fabric and the base resin be made of the same resin material, which gives particularly satisfactory adhesive strength.

The layering of the conductive fabric on the base can be carried out by the disposition of the conductive fabric on the base or by the use of an adhesive as a temporary glue. Moreover, not only the conductive fabric is layered on only one side of the base, but also the fabric can be layered on both sides of the base. After layering is done, the temperature is raised to the temperature at which the thermoplastic fibers melt, or higher, and while the said thermoplastic fibers are melting, the layers are pushed so as to adhere to each other.

For the heating treatment, direct application of heat by heated plates in a press can be used, and it is also suitable to use high-frequency induction heating, etc., which makes use of the conductivity of the conductive fabric. Also, as a method to apply pressure, the application of pressure with a press or the applications of pressure with a roll can be used. For example, when the thermoplastic fibers and the base are made of polyvinylchloride resin, the temperature is 130–190° C., and the pressure is 5–50 kg/cm$^2$.

Figure 10:
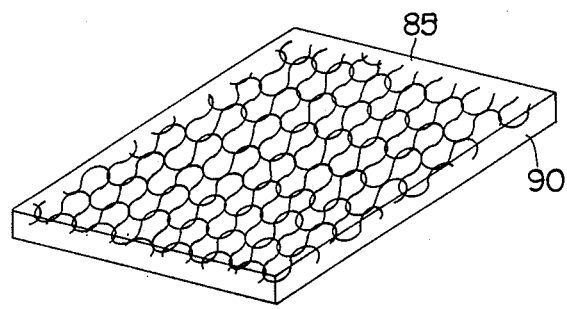
FIG. 10 is a perspective view showing a conductive sheet of this invention.
Figure 11:
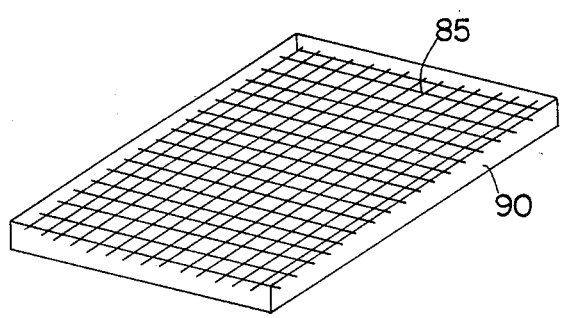
FIG. 11 is a perspective view showing another conductive sheet of this invention.
Figure 12:
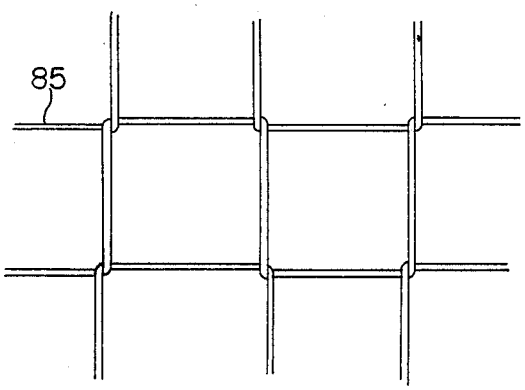
FIG. 12 is a diagram showing the stretching of the conductive fibers constituting the conductive fabric.

The molten base material can be fed onto the conductive fabric by an extrusion molding technique so as to complete the layering of the conductive fabric on the base and the heating of the two layers at the same time. When the base is a thick plastic sheet, a conductive sheet can be obtained, and when the base is a thin plastic film, a conductive film can be obtained. A conductive fabric made by knitting is shown in FIG. 10 and a conductive sheet made by weaving is shown in FIG. 11, in which the reference numeral 85 is the conductive fibers, and 90 is the base. The conductive fibers 85 are stretched from the condition shown in FIG. 1 to the stretched conditions shown in FIG. 12.

When the final product obtained should be transparent, the conductive fibers should not be like spun yarn, with poor surface smoothness, but are preferably like filaments. However, it is necessary for the smoothness of the surface of filaments not to be damaged by processing; during twisting, the smoothness is not damaged. The weight of the conductive fibers in the sheets or films is preferably 3–100 g/m$^2$; for example, with a thread of 40–60 deniers, metal fibers are preferably used with 3–70 g/m$^2$, and carbon fibers, synthetic resin fibers to which metal ions have been adsorbed, or metal-plated synthetic-resin fibers are preferably used at the rate of 3–25 g/m$^2$, so that transparency to all light will be 40% or more.

The conductive fabric and conductive sheets or films of this invention, the products made with these, and a laminated product thereof with another kind of base are useful for the following: For example, they can be used for trays, containers, and packaging of electronic devices such as semiconductor devices, etc.; filling cases for storage of magnetic disks or magnetic cards and other kinds of recording materials; electronic or electrical products such as personal computers, word processors, etc.; housings; partitions, etc., of office automation rooms or clean rooms, which should prevent charging by electricity and/or shield electrons therefrom.

The conductive fibers in the conductive fabric of this invention are crimped around the other fibers, so even if the said fabric is heated and stretched, there is no ripping of the fabric, and the conductivity is maintained.

Figure 13:
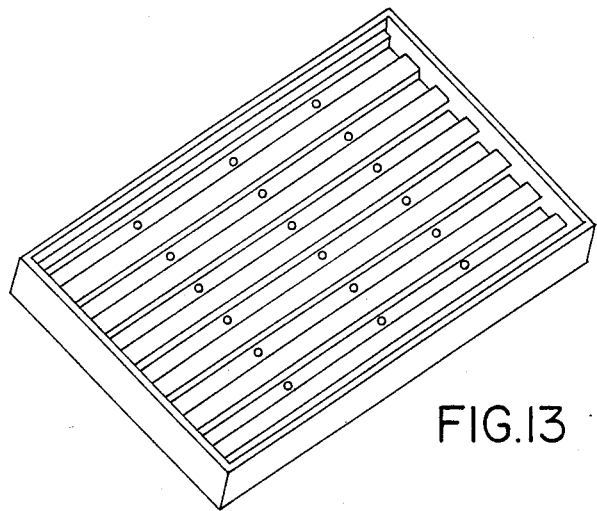
FIG. 13 is a perspective view showing a molded article obtained from the conductive sheet.

In the conductive sheets or films of this invention, the conductive fibers of the fabric that is incorporated with the base in the molten state have been crimped, and even when the said sheets or films are treated by deep drawing processing by vacuum forming, pressure forming, or the like and a molded article (for example, a container like that shown in FIG. 13) made from them is spread with the addition of heat to a surface area twice that of the original sheet or film, or more, the conductive fibers will not readily break, so that the conductive fibers can stretch sufficiently within the sheets or films. The conductive fibers can also act in the same manner in the conductive film of this invention.

In the method for the manufacture of the conductive fabric of this invention, the textile or the knit, which is formed from a thread twisted together composed of a conductive fiber and a thermoplastic fiber that has a heat shrinkage greater than that of said conductive fiber, is heat-treated. By such a heating treatment, the conductive fiber, which is finally twisted into a spiral, shrinks along the long axis of the thermoplastic fiber, so that the intervals between the spirals of the conductive fiber are decreased in the long axis direction. As a result, the degree of crimping of the conductive fiber can be set to a desired level.

EXAMPLE 1

A 50-denier acrylonitrile fiber to which copper sulfide have been adsorbed (Nippon Sammo Dyeing Co., Ltd.; product name, Thunderon) and a 100-denier polyvinylchloride fiber (Teijin Co., Ltd.; product name, Teviron, with a heat shrinkage of 30–40% at 100° C.) were twisted together into a single thread, and these threads were knitted together. The knit obtained was heat-treated at 100° C., and then made to adhere on both sides of a rigid polyvinylchloride plate with a thickness of 1 mm (Sekisui Chemical Co., Ltd.; product name, Eslon plate) with tetrahydrofuran. This was formed into a pressed sheet at the temperature of 170° C. under the pressure of 30 kg/cm$^2$. The weight of the acrylonitrile fiber with copper sulfide adsorbed thereonto in this sheet was 20 g/m$^2$. The properties of the sheet obtained were as shown in Table 3.

EXAMPLE 2

The knit of Example 1 was heat-treated at 100° C., and then pressed at the temperature of 170° C. under the pressure of 30 kg/cm$^2$, resulting in a film with a thickness of 0.1 mm. There was, in this sheet, 10 g of the acrylonitrile fiber with copper sulfide adsorbed thereonto per square meter. The properties of the film obtained were as shown in the Table 3.

EXAMPLE 3

A copper fiber of 50 denier (Esco Co., Ltd.; product name, Caplon) and a polyvinylchloride fiber of 100 denier (Teijin Co., Ltd.; product name, Teviron, with a heat shrinkage of 30–40% at 100° C.) were twisted together into a single thread, which were then knitted. The resulting knit was treated under the same conditions as in Example 1, giving a sheet therefrom. There was, in this sheet, 30 g of copper fiber per square meter. The properties of the sheet obtained were as shown in Table 3.

EXAMPLE 4

The same thread as in Example 3 was used to make a textile, and under the same conditions as in Example 1, this was made into a sheet. There was, in this sheet, 20 g of the copper fiber per square meter. The properties of the sheet obtained were as shown in Table 3.

COMPARATIVE EXAMPLE 1

The copper fiber of 50 deniers (Esco Co., Ltd.; product name, Caplon) and polyvinylchloride fiber of 100 denier (Teijin Co., Ltd.; product name, Teviron, with a heat shrinkage of 30–40% at 100° C.) was made into a textile with the first as the warp and the second as the woof, and this textile was made to adhere on both sides of a hard polyvinylchloride plate with a thickness of 1 mm (Sekisui Chemical Co., Ltd., product name, Eslon plate) with tetrahydrofuran. This was formed into a pressed sheet at the temperature of 170° C. under the pressure of 30 kg/cm$^2$. There was, in this sheet, 20 g of the copper fiber per square meter. However, the sheet obtained, when treated by deep drawing processing by vacuum forming, pressure forming, or the like, underwent cutting of its copper fiber, and the original conductivity could not be maintained.

TABLE 3

| | Properties of conductive sheets or films | | | | |
|---|---|---|---|---|---|
| | Percentage Climp (%) of conductive fibers in fabric | Resistance ($\Omega$) of surface | Shield effect from electromagnetic waves (dB) in the range of 100 to 1000 MHz | Spreading ratio of sheets or films without changing of initial properties | Transmittance (%) |
| Example 1 | 30 | 10$^3$ | 10–30 | 3.0 | 45 |
| Example 2 | 30 | 10$^3$ | 10–30 | 3.0 | 55 |
| Example 3 | 30 | 10$^2$ | 14–60 | 3.0 | 55 |
| Example 4 | 40 | 10$^2$ | 10–50 | 2.7 | 55 |
| Comparative example 1 | 0 | 10$^3$ | 10–30 | 1.0 | 55 |

Note:
Percentage climp in the table was calculated as follows by th JIS standard.
Percentage climp (%) = 100 (l$_1$ − l$_0$)/l$_1$
wherein l$_0$ is the length when the tension is low and l$_1$ is the length to which stretching occurs when a tension of 50 mg is applied for 1 min per denier.
The spreading ratio in the table is shown as the surface ratio after stretched.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A conductive fabric comprising conductive fibers and thermoplastic fibers with a higher heat shrinkage before heat treatment than that of said conductive fibers, said conductive and thermoplastic fibers being in twisted engagement, wherein said conductive fibers have been drawn about said thermoplastic fibers and crimped as a consequence of heat-shrinking said thermoplastic fibers.

2. A conductive fabric according to claim 1, wherein said conductive fibers and said thermoplastic fibers form a textile or a knit.

3. A method for the manufacture of a conductive fabric from conductive fibers and thermoplastic fibers with a higher heat shrinkage than the conductive fibers comprising:

giving the conductive fibers and the thermoplastic fibers, respectively, a first twist;

twisting both the conductive fibers and the thermoplastic fibers into single threads;

weaving or knitting said single threads twisted together to continuously form a textile or a knit;

gathering the textile or the knit to continuously form gathers of size predetermined by the degree of conductive fiber crimping desired by a gathering apparatus; and heating the gathered textile or knit to heat shrink the thermoplastic fibers, causing the conductive fibers to draw and crimp about the thermoplastic fibers.

4. A method for the manufacture of a conductive fabric according to claim 3, wherein the number of first twists given to the thermoplastic fibers is greater than that of first twists given to the conductive fibers.

5. A method for the manufacture of a conductive fabric according to claim 3, wherein the diameter of the thermoplastic fibers is greater than that of the conductive fibers.

6. A method for the manufacture of a conductive fabric according to claim 3, wherein said gathering apparatus comprises supports for supporting the textile or the knit with fixed intervals in the direction in which the textile or the knit is continuously formed, and pushers for pushing the textile or the knit toward the spaced supports in sequence to form gathers.

7. A method for the manufacture of a conductive fabric according to claim 6, wherein said supports and said pushers are a pair of gears that mesh together.

8. A method for the manufacture of a conductive fabric according to claim 6, wherein said supports are disposed on the outer surface of an endless belt.

9. A method for the manufacture of a conductive fabric according to claim 8, wherein said endless belt is disposed in such a manner that the outer surface thereof faces one surface of the textile or the knit.

10. A method for the manufacture of a conductive fabric according to claim 8, wherein said endless belt is disposed in such a manner that the outer surface thereof moves at almost right angles to the textile or the knit.

11. A method for the manufacture of a conductive fabric according to claim 8, wherein said pushers move back and forth from positions separated from the textile or the knit to positions in which they fit into the spaces between the adjacent supports supporting the textile or the knit thereon.

12. A conductive sheet or film comprising a conductive fabric composed of conductive fibers and thermoplastic fibers with a higher heat shrinkage before heat treatment than that of the conductive fibers, said conductive and thermoplastic fibers being in twisted engagement wherein said conductive fibers have been drawn about said thermoplastic fibers and crimped as a consequence of heat-shrinking said thermoplastic fibers, and a base on which said conductive fabric is disposed, said conductive fabric and said base being laminated together and fused into one piece as a result of having been heated at a temperature above the melting point of the thermoplastic fibers.

13. A conductive sheet or film according to claim 12, wherein said conductive fabric is a textile or a knit.

14. A conductive sheet or film according to claim 12, wherein said base is a sheet or film of synthetic resin.

* * * * *